(12) United States Patent
Levy et al.

(10) Patent No.: US 8,650,128 B2
(45) Date of Patent: Feb. 11, 2014

(54) RIGHTS MANAGEMENT SYSTEM AND METHODS

(75) Inventors: Kenneth L. Levy, Stevenson, WA (US); Geoffrey B. Rhoads, West Linn, OR (US); R. Stephen Hiatt, Portland, OR (US)

(73) Assignee: Digimarc Corporation, Beaverton, OR (US)

(*) Notice: Subject to any disclaimer, the term of this patent is extended or adjusted under 35 U.S.C. 154(b) by 1467 days.

(21) Appl. No.: 11/847,914

(22) Filed: Aug. 30, 2007

(65) Prior Publication Data

US 2007/0294173 A1   Dec. 20, 2007

Related U.S. Application Data

(63) Continuation of application No. 10/126,921, filed on Apr. 18, 2002, now Pat. No. 7,266,704, which is a continuation-in-part of application No. 10/017,679, filed on Dec. 13, 2001, now abandoned.

(60) Provisional application No. 60/256,628, filed on Dec. 18, 2000, provisional application No. 60/336,209, filed on Oct. 30, 2001, provisional application No. 60/285,514, filed on Apr. 20, 2001, provisional application No. 60/315,569, filed on Aug. 28, 2001.

(51) Int. Cl.
*G06F 21/00* (2013.01)

(52) U.S. Cl.
USPC ............................. 705/52; 705/50; 705/909

(58) Field of Classification Search
USPC .......................................................... 705/52
See application file for complete search history.

(56) References Cited

U.S. PATENT DOCUMENTS

| | | | |
|---|---|---|---|
| 4,807,031 | A | 2/1989 | Broughton et al. |
| 4,931,871 | A | 6/1990 | Kramer |
| 5,329,108 | A | 7/1994 | Lamoure |
| 5,436,653 | A | 7/1995 | Ellis et al. |
| 5,450,490 | A | 9/1995 | Jensen et al. |

(Continued)

FOREIGN PATENT DOCUMENTS

| | | |
|---|---|---|
| WO | WO0229510 | 4/2002 |
| WO | WO02091375 | 11/2002 |

OTHER PUBLICATIONS

White, "How Computers Work", Millennium Edition, 1999, Que Corporation, Indianapolis, IN, all pages.*

(Continued)

*Primary Examiner* — Jacob C. Coppola (57) ABSTRACT

A method of performing digital asset management of content is provided. The content is identified with an identifier. The identifier can be identified with a digital watermark, header file, or both. The identifier is linked to usage rules to regulate usage and protect the content. The usage rules can be maintained on a remote or local database or server. Once extracted, an identifier is used to index the database to locate a corresponding usage rule, and can be used to override copy control information with proper purchase and subsequent protection. Content can be managed from such. In another embodiment, an identifier is used to track usage, such as amount of content viewed, time played, and copies made. In yet another embodiment, a content identifier is used to regulate content throughout a distribution chain, and a distributed set of databases with information relevant only to the owner of the database act as one database due to a central router.

10 Claims, 5 Drawing Sheets

(56) References Cited

U.S. PATENT DOCUMENTS

| | | | |
|---|---|---|---|
| 5,499,294 A | 3/1996 | Friedman | |
| 5,574,962 A | 11/1996 | Fardeau et al. | |
| 5,579,124 A | 11/1996 | Aijala et al. | |
| 5,613,004 A * | 3/1997 | Cooperman et al. | 380/28 |
| 5,636,292 A | 6/1997 | Rhoads | |
| 5,748,763 A | 5/1998 | Rhoads | |
| 5,765,152 A | 6/1998 | Erickson | |
| 5,768,426 A | 6/1998 | Rhoads | |
| 5,832,119 A * | 11/1998 | Rhoads | 382/232 |
| 5,841,978 A | 11/1998 | Rhoads | |
| 5,845,281 A | 12/1998 | Benson et al. | |
| 5,896,454 A * | 4/1999 | Cookson et al. | 360/60 |
| 5,915,027 A | 6/1999 | Cox et al. | |
| 5,991,500 A | 11/1999 | Kanota et al. | |
| 5,991,876 A * | 11/1999 | Johnson et al. | 726/28 |
| 6,026,193 A * | 2/2000 | Rhoads | 382/232 |
| 6,108,434 A | 8/2000 | Cox et al. | |
| 6,112,008 A | 8/2000 | Sugita et al. | |
| 6,285,774 B1 | 9/2001 | Schumann et al. | |
| 6,298,482 B1 | 10/2001 | Seidman et al. | |
| 6,345,256 B1 | 2/2002 | Milsted et al. | |
| 6,408,331 B1 | 6/2002 | Rhoads | |
| 6,418,421 B1 | 7/2002 | Hurtado et al. | |
| 6,430,301 B1 | 8/2002 | Petrovic | |
| 6,433,946 B2 | 8/2002 | Ogino | |
| 6,449,367 B2 * | 9/2002 | Van Wie et al. | 380/232 |
| 6,519,352 B2 * | 2/2003 | Rhoads | 382/100 |
| 6,522,769 B1 * | 2/2003 | Rhoads et al. | 382/100 |
| 6,530,021 B1 | 3/2003 | Epstein et al. | |
| 6,542,620 B1 | 4/2003 | Rhoads | |
| 6,571,220 B1 | 5/2003 | Ogino et al. | |
| 6,591,365 B1 | 7/2003 | Cookson | |
| 6,601,046 B1 * | 7/2003 | Epstein | 705/57 |
| 6,609,105 B2 | 8/2003 | Van Zoest et al. | |
| 6,618,484 B1 * | 9/2003 | Van Wie et al. | 380/232 |
| 6,664,976 B2 | 12/2003 | Lofgren et al. | |
| 6,802,011 B1 * | 10/2004 | Ogino | 726/32 |
| 6,807,534 B1 | 10/2004 | Erickson | |
| 6,829,368 B2 | 12/2004 | Meyer et al. | |
| 6,950,532 B1 | 9/2005 | Schumann et al. | |
| 6,980,226 B2 | 12/2005 | Jones et al. | |
| 7,006,661 B2 * | 2/2006 | Miller et al. | 382/100 |
| 7,035,427 B2 | 4/2006 | Rhoads | |
| 7,042,470 B2 | 5/2006 | Rhoads et al. | |
| 7,068,809 B2 | 6/2006 | Stach | |
| 7,127,744 B2 | 10/2006 | Levy | |
| 7,184,570 B2 | 2/2007 | Rhoads | |
| 7,240,206 B2 * | 7/2007 | Kori et al. | 713/176 |
| 7,266,704 B2 * | 9/2007 | Levy | 713/193 |
| 7,372,976 B2 | 5/2008 | Rhoads et al. | |
| 7,392,392 B2 | 6/2008 | Levy | |
| 7,484,100 B1 | 1/2009 | Grossman | |
| 7,587,601 B2 | 9/2009 | Levy et al. | |
| 7,593,576 B2 | 9/2009 | Meyer et al. | |
| 7,647,642 B2 | 1/2010 | Erickson | |
| 7,650,009 B2 | 1/2010 | Rhoads | |
| 7,724,919 B2 | 5/2010 | Rhoads | |
| 7,756,892 B2 | 7/2010 | Levy | |
| 7,822,969 B2 | 10/2010 | Anglin | |
| 2001/0049788 A1 | 12/2001 | Shur | |
| 2002/0023020 A1 | 2/2002 | Kenyon et al. | |
| 2002/0033844 A1 * | 3/2002 | Levy et al. | 345/744 |
| 2002/0066019 A1 | 5/2002 | Amonou et al. | |
| 2002/0082997 A1 * | 6/2002 | Kobata et al. | 705/51 |
| 2002/0112171 A1 | 8/2002 | Ginter et al. | |
| 2002/0146236 A1 | 10/2002 | Kauffman et al. | |
| 2002/0150239 A1 | 10/2002 | Carny et al. | |
| 2002/0152172 A1 | 10/2002 | Hars et al. | |
| 2002/0186844 A1 * | 12/2002 | Levy et al. | 380/231 |
| 2003/0033321 A1 | 2/2003 | Schrempp et al. | |
| 2003/0056103 A1 * | 3/2003 | Levy et al. | 713/176 |
| 2003/0163724 A1 * | 8/2003 | Tayebi et al. | 713/200 |
| 2005/0018873 A1 * | 1/2005 | Rhoads | 382/100 |
| 2005/0091268 A1 * | 4/2005 | Meyer et al. | 707/103 R |
| 2006/0062426 A1 | 3/2006 | Levy et al. | |
| 2007/0294173 A1 | 12/2007 | Levy et al. | |
| 2008/0140433 A1 | 6/2008 | Levy et al. | |

OTHER PUBLICATIONS

Derfler, "How Networks Work," Bestseller Edition, 1996, Ziff-Davis Press, Emeryville, CA, all pages.*

Gralla, "How the Internet Works," Millennium Edition, 1999, Que Corporation, Indianapolis, IN, all pages.*

Muller, "Desktop Encyclopedia of the Internet," 1999, Artech House Inc., Norwood, MA, all pages.*

Adelsbach, A. et al., "Proving Ownership of Digital Content," Proc. 3.sup.rd Int. Workshop on Information Hiding, LNCS vol. 1768, Sep./Oct. 1999, 17 pages.

Bender, "Applications for Data Hiding," IBM Systems Journal, vol. 39, No. 3-4, pp. 547-568, 2000.

Gruhl et al., "Information Hiding to Foil the Casual Counterfeiter," Proc. 2d Information Hiding Workshop, LNCS vol. 1525, pp. 1-15 (Apr. 15, 1998).

Zhao, J., "A WWW Service to Embed and Prove Digital Copyright Watermarks," Proc. European Conf. on Multimedia Applications, Services and Techniques (ECMAST'96), May 1996, 15 pages.

Kalker, T., "System Issues in Digital Image and Video Watermarking for Copy Protection," Proc. IEEE Int. Conf. on Multimedia Computing and Systems, Jun. 1999, pp. 562-567.

* cited by examiner

| Unique ID | | | | |
|---|---|---|---|---|
| Content Owner ID | Content ID | Distributor ID | VOD Operator ID | Retailer ID |

Fig. 5

| Unique ID | | | Usage Rules |
|---|---|---|---|
| Content Owner ID | Content ID | Distributor ID | Distributor Usage Rules |
| Content Owner ID | Content ID | VOD Operator ID | VOD Operator Usage Rules |
| Content Owner ID | Content ID | Retailer ID | Retailer Usage Rules |
| Content Owner ID | Content ID | N/A | Consumer Usage Rules |

| Uniqe ID | | | Usage Rules | Billing Information |
|---|---|---|---|---|
| Content Owner ID | Content ID | Distributor ID | Distributor Usage Rules | Price to VOD Operator |
| Content Owner ID | Content ID | VOD Operator ID | VOD Operator Usage Rules | Price to Retailer |
| Content Owner ID | Content ID | Retailer ID | Retailer Usage Rules | Price to Consumer |
| Content Owner ID | Content ID | N/A | Consumer Usage Rules | Price to Distributor |

Fig. 9

| Central Router Database | |
|---|---|
| Content Owner A ID | Content Owner A IP address |
| VOD Operator B ID | VOD Operator B IP Address |

| Content Owner A Database | | | | |
|---|---|---|---|---|
| Uniqe ID | | | Usage Rules | Billing Information |
| Content Owner ID | Video D ID | VOD Operator ID | VOD Operator Usage Rules | Price to Consumer |
| Content Owner ID | Video D ID | N/A | Consumer Usage Rules | Price to VOD Operator |

| VOD Operator B Database | | | |
|---|---|---|---|
| Uniqe ID | | Usage Rules | Billing Information |
| Content Owner ID | Video D ID | VOD Operator Usage Rules | Price to Consumer |

RIGHTS MANAGEMENT SYSTEM AND METHODS

RELATED APPLICATION DATA

This application is a continuation of U.S. patent application Ser. No. 10/126,921, filed Apr. 18, 2002 (issuing as U.S. Pat. No. 7,266,704). The 10/126,921 application is a continuation in part of U.S. patent application Ser. No. 10/017,679, filed Dec. 13, 2001 (published as US 2003-0056103 A1), which claims the benefit of U.S. Provisional Application Nos. 60/256,628, filed Dec. 18, 2000 and 60/336,209, filed Oct. 30, 2001. The 10/126,921 application also claims the benefit of U.S. Patent Application Nos. 60/285,514, filed Apr. 20, 2001 and 60/315,569, filed Aug. 28, 2001. Each of the above-mentioned patent documents is hereby incorporated by reference.

TECHNICAL FIELD

The present invention relates to integrating identified content with digital rights management systems. The present invention also relates to multimedia signal processing, such as steganographically encoding auxiliary information into media signals, and decoding the auxiliary information from the media signals.

BACKGROUND AND SUMMARY OF THE INVENTION

As digital content continues to proliferate, management of digital assets becomes an increasingly difficult challenge. The term "content" is broadly defined herein and may include audio, video, images, electronic data, biometric information, graphics and designs, electronic documents, copyrighted materials, software, multimedia content, etc., etc. Sometimes we interchangeably use the term "media" instead of content in this document. Enhancements in computer networking and database technology allow companies to manage large content collections and to make the content available to third parties. While network communication provides a powerful tool to enable a database manager to share content with others, it makes it more difficult to control and track how the content is being used.

For example, some companies maintain extensive content databases to promote their products. Customers or service providers such as advertising and marketing firms can access this content remotely via an internet, extranet, web site, intranet, LAN, WAN, wireless network or file transfer transactions. Although computer networking telecommunication technology facilitates access, it makes it difficult to ensure that customers and services providers are getting the latest content, and that they are getting accurate and helpful information relating to the content.

There is a need to enable digital rights management systems to reliably link content with additional, related data—including related content. The terms "link" and "linking" are defined broadly herein to include associating, pointing to, facilitating the access of, linking, connecting or connecting to, revealing an storage address of, and/or facilitating database interrogation, etc. There is also a need for a digital rights management system to reliably link content with related usage billing information. One way to associate content with information about the content is to place the information in a file header or footer. This approach is not terribly attractive because the added information often does not survive file format changes, conversion to the analog domain, and is susceptible to being stripped away, etc. We believe that an improved approach to associate content with related data is to steganographically hide identifying information within the content. One example of steganography is digital watermarking.

Digital watermarking is the science of encoding physical and electronic objects with plural-bit digital data, in such a manner that the data is essentially hidden from human perception, yet can be recovered by computer analysis. Most commonly, digital watermarking is applied to media such as images, audio signals, and video signals. However, it may also be applied to other types of data, including documents (e.g., through line, word or character shifting), software, multi-dimensional graphics models, and surface textures of objects. In physical objects, the data may be encoded in the form of surface texturing, or printing. Such marking can be detected from optical scan data, e.g., from a scanner, optical reader, input device, digital camera, or web cam. In electronic media (e.g., digital audio or imagery—including video), the data may be encoded as slight variations in sample values. Or if the media is represented in a so-called orthogonal domain (also termed "non-perceptual," e.g., MPEG, DCT, wavelet, etc.), the data may be encoded as slight variations in quantization values or levels. The assignee's U.S. Pat. Nos. 5,862, 260 and 6,122,403, and U.S. application Ser. No. 09/503,881, filed Feb. 14, 2000, are illustrative of certain digital watermarking technologies. Each of these U.S. patent documents is herein incorporated by reference. A great many other approaches are familiar to those skilled in the art. The artisan is presumed to be familiar with the full range of literature about steganography, data hiding and digital watermarking.

Digital watermarking systems typically have two primary components: an encoder that embeds the watermark in a host media signal, and a decoder that detects and reads the embedded watermark from a signal suspected of containing a watermark (e.g., a suspect signal). The encoder embeds a watermark by altering the host media signal. For example, the encoder (or embedder) component embeds a watermark by altering data samples of the media content in the spatial, temporal or some other transform domain (e.g., Fourier, Discrete Cosine, Wavelet Transform domains). The decoder component analyzes a suspect signal to detect whether a watermark is present. In applications where the watermark encodes information, the decoder extracts this information from the detected watermark.

The analysis of the detected data can be accomplished in various known ways. Presently, most steganographic decoding relies on general-purpose microprocessors that are programmed by suitable software instructions to perform the necessary analysis. Other arrangements, such as using dedicated hardware, reprogrammable gate arrays, or other techniques, can of course be used.

According to one aspect of our invention, a digital watermarking system includes (or communicates with) a secondary component—a database. Such a database preferably includes data related to content. The related data may include, e.g., content owner or copyright information, metadata, usage rights, enhanced or interactive content, and billing information, etc. This related data is preferably organized or linked according to respective content identifiers. For example, if the content includes a song and the related data includes usage rules, then the usage rules can be associated with the song via a content identifier that is unique to the song or to a class of related songs. The database can be stored locally, remotely, or both. The database can also be distributed, with different databases stored in different networks or locations, such as a complete central and mirrored database and local databases including only subsets of the related data on a local computer. Of course our usage of the term database throughout this document is broad enough to include software-based databases, data records, data structures, etc., etc.

User-friendly digital rights management systems are preferred in our evolving digital and connected world. Many digital rights management systems fail because they focus solely on the content owner's security desires and not on consumer usage. As such, these rights management systems are not acceptable to consumers. A historical example is taken from the software industry in the 1980's, when that industry abandoned copy protection. We have solved some of the failing associated with traditional digital rights management systems. Our inventive user-friendly digital rights management system provides transparent usage models to consumers while protecting the content. In one implementation, a user-friendly rights management system enables consumers to easily purchase content that they want to play or use, as opposed to stopping consumers from using the content. One benefit of our inventive system is that it is now easier for a mass market to purchase content, rather than use illegitimately obtained content.

In one embodiment of the present invention, a digital watermark embedded within a content item is used to convey a content identifier(s). In a second embodiment, file headers associated with a content item include a content identifier(s). In still another embodiment, both digital watermarks and file headers are used to carry content identifiers. Content identifiers can be linked to related data, such as "usage rights" (or "usage rules") common in some digital rights management (DRM) systems. (The artisan is presumed familiar with the many DRM systems, a few of which are described in U.S. Pat. Nos. 5,765,152, 5,410,598, 5,943,422, 6,363,488 and 6,330,670. Of course there are many other DRM systems and containers that can be enhanced by the present invention.). These rules typically define the scope of permissible content use, e.g., such as regulating printing, viewing, copying, altering, distributing, selling, etc. Digital watermarks—including a content identifier—can be used for content tracking and data management. In another embodiment, digital watermarks are used in connection with DRM content containers. Another aspect of the invention is a method of performing digital asset management of media content. In even another embodiment the copy protection state (also known as copy control information including copy freely, copy no more, copy never, and/or copy once) can be overridden through linking the identifier to usage rules, if the usage rules allow copy protection information to be overridden, e.g., to enable the sale or distribution of the content. This enables the content owners to be properly paid, and users to share content, instead of merely prohibiting use of the content.

One aspect of the present invention provides content owners with copy protection security and royalty tracking, and end-users with an easy-to-use system that improves current content distribution methods, such as CD, DVD and VHS. A combination of watermarking and DRM techniques can be employed, where a watermark allows content to leave and be found outside an associated DRM package without harming the security of the system. The watermark identification can link the content to the usage rules, and, optionally, the usage rules can dictate whether the content should be re-packaged into the DRM package if found outside of it. This means that content found outside the DRM package can be purchased and used, as well as re-secured, as opposed to that content being considered illegal and perhaps destroyed. This inventive feature increases the revenue generated from the content. A DRM package is broadly defined and may include an encryption-based format, or a container in which content is securely maintained, etc. Artisans know many DRM packaging techniques, which may be suitably interchanged with the packaging aspect of the present invention. DRM systems help publishers or content owners prevent unauthorized copying, replication, usage or distribution of their software products, either via CD-ROM, via the Internet, transfer, etc. Other DRM systems incorporate encryption, digital signature and license manager technologies, and enable authentication from either a disc, online database, or from a PC hard drive. These technologies can be applied to secure CD-ROM or computer executable files, and to maintain desired control over the distribution of content during its life cycle. A DRM package that allows licensing and reporting provides an ideal rights management system for audio, video and images.

Still another aspect of the present invention is to provide an efficient distribution chain based on identified content, particularly when combined with our inventive techniques. Yet another aspect of the present invention is linking together databases that are stored and protected by a network of the database owner, and enabling those databases to function as one database via a central router and database.

Further features, advantages and benefits will become apparent with reference to the following detailed description and drawings.

DETAILED DESCRIPTION

Rights Management System

Figure 1:
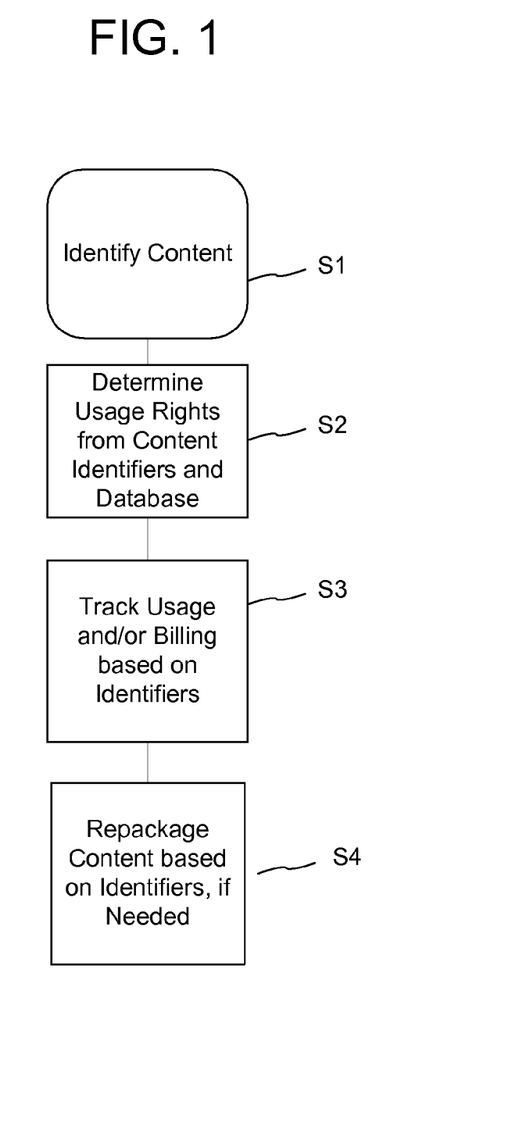
FIG. 1 illustrates a flow diagram of a content management process according to one embodiment of the present invention.

With reference to FIG. 1, a rights management system preferably includes four steps. In step S1, content, whether within an encryption package or not, is identified before rendering. ("Rendering" here has its familiar meaning of presenting for visual and/or audible inspection, e.g., on a TV, audio player, etc. Our use of the term "rendering" is broad enough to include transferring, copying and distributing.). Content is preferably identified by steganographically encoding data within the content, such as in the form of a digital watermark. The digital watermark preferably includes a unique content identifier. Content can be alternatively identified via frame and/or segment headers.

Usage rights are determined in step S2 via linking the content identifier to external data (e.g., data defining the usage rules). In general, usage rules define the scope of permitted use for respective content. Examples of usage rules include the scope of permissible copying, rendering, transferring, altering, playing, viewing, printing, distributing, using, etc. Content identifiers can be used to organize a database that is maintained locally or remotely (e.g., a central usage system). Once extracted from content, an identifier can be then used to interrogate the database to retrieve the usage rules. Content usage is regulated based on its corresponding usage rules.

Content usage can be tracked via an identifier in step S3. This usage tracking can be used, e.g., for proper billing to the consumer and payment to content owners and providers. Tracking can be incremental or per content item. In one embodiment, each video frame or every nth frame (or audio segment) is uniquely or redundantly identified. Tracking identifiers per frame (or audio segment) allows for a "pay-as-you-go" system, in that a consumer can be billed for only the amount of content they view, access or listen to. In another embodiment, billing is based on a one-time access fee.

As a fourth and optional step (step S4), if content is found outside of its respective DRM, and it should be in the DRM package as dictated by related usage rules, the content identifier can help facilitate repackaging of the content in a DRM container. Initially, the identifier will help identify the content. The identifier can also identify or point to a specific package or packaging protocol, or the identifier can link to repackaging requirements. An identifier can also be linked to usage rules, which can regulate content usage, even for content outside of a package. Examples of content being located outside of a container include transferring the content to a different medium, or converting from a digital format to an analog format. Since the content identifier is content specific, e.g., it is associated with the content and not the container, it persists with the content, even when the content is found outside of a container.

The preceding second through fourth steps preferably proceed on the assumption that the content has been packaged in an encryption container (or other DRM format) and digitally watermarked (or otherwise identified) prior or during distribution. Content that is not protected nor identified can be handled under default system rules, such as allowing unrestricted usage or view-only usage.

In a preferred implementation, the identifier is provided via a digital watermark, potentially combined with header data for additional access. An advantage of a digital watermark identifier is that the watermark will typically survive end-user recording of the content onto new media or into a new format. This new format may be desirable for end-users to use multiple rendering devices, or used to try to bypass the security system. However, identifying the content itself helps to enforce security features and continue to track content, even when the content is found outside of a DRM container.

Optionally, the embedded data (e.g., a digital watermark) can provide fine-grain usage and quality of content monitoring as well as copy protection. An example of fine grain usage is to monitor content subsets, such as an audio segment or set of video frames. A watermark can be redundantly embedded per frame or segment, or different watermarks can be embedded per each frame or segment, to allow counting or monitoring of the content subsets.

Home Network System

Figure 2:
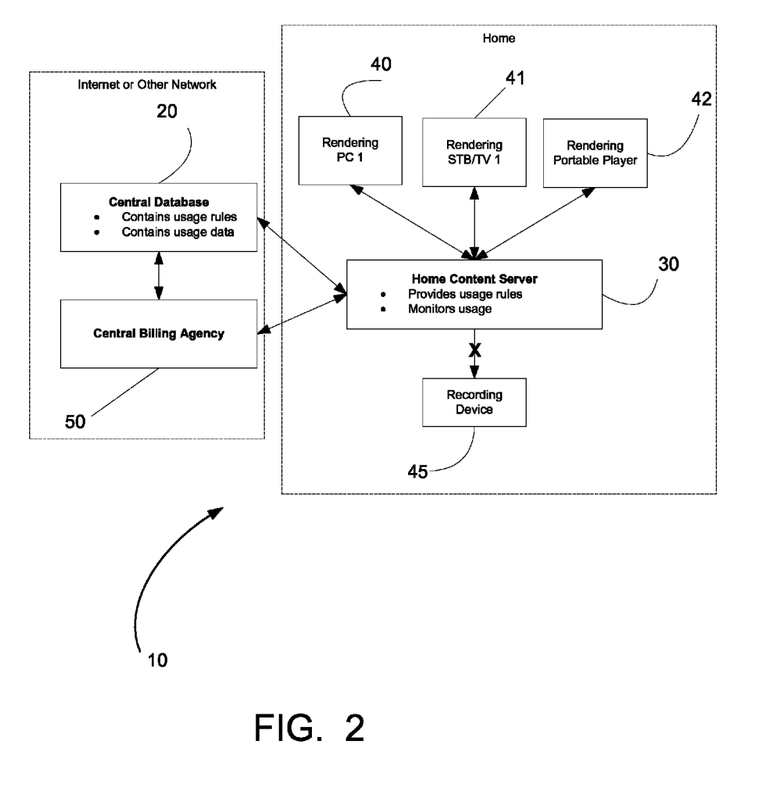
FIG. 2 illustrates a system for enhancing digital content management by identifying content, and linking the content with usage rules or permissions.

A home rights management system 10 is shown in FIG. 2. System 10 includes a local home network (indicated by the dashed-line box labeled "Home"). The local home network includes a home content server 30 in continuous or intermittent communication with rendering devices 40-42. The operation of our inventive system 10 is preferably indifferent to how content stored on the home content server 30 is initially obtained, and indifferent to whether the content is packaged in an encryption or other DRM package. The system 10 architecture and system 10 operations are described below.

Home content server 30 can include a personal computer that has downloaded compressed content from a web site or peer-to-peer site via the internet. Alternatively, home content server 30 can be a set-top box (STB) with suitable computing functionality. Or home content server 30 can include a storage device with computing, database and communication functionality. Of course, home content server 30 need not be located in a home, but may be located in an office, building, garage, theater, mobile computer, handheld device, etc.

Returning to FIG. 2, system 10 preferably includes and central database 20 and central billing agency 50. Central database 20 and central billing agency 50 can be associated or otherwise communicate (e.g., as shown by the dashed-line box labeled "Internet . . . " in FIG. 2). Of course the invention is not so limited. Indeed, there need not be interaction between database 20 and agency 50. In addition, agency 50 may be contacted only monthly, when, e.g., the home content server 30 reports its monthly usage. Central database 20 can communicate with home center server 30, via a network such as the internet (e.g., via a cable modem, modem or DSL), dial-up network, dedicated network, LAN, WAN, etc. Central database 20 is preferably contacted whenever new content, which was not sent with its usage rules to be stored in a local database such as home content server 30, enters the home network. In another embodiment, central database 20 includes a plurality of distributed databases, which are synchronized or which include specific subsets of content (e.g., based on region, genre, content, etc.). In another embodiment, central database 20 includes a plurality of peer-to-peer nodes. Database management software can be used to help track and manage content, content identifiers, and related content.

Central database 20 preferably maintains a set of usage rules. The usage rules define use limits for related content. The usage rules can be communicated to various network locations, such as to home content server 30. Home content server 30 can query central database 20 to obtain or update usage rules, or updated rules can be pushed to home content server 30. Server 30 can also cache the usage rules locally, or can occasionally query database 20 to obtain updates, etc.

Preferably, each of rendering device PC 40, STB/TV (or VCR, PVR or DVD, etc.) 41 and portable player 42 communicates with home content server 30, either continuously or intermittently. In one embodiment, some or all of the rendering devices communicate over a wireless channel. Of course, the invention is not so limited. Indeed, the rendering devices can communicate through other channels as well (e.g., via USB, parallel ports, communication links, IEEE 1394, firewires, modems, coaxial cable, twisted pair, etc., etc.). In some implementations server 30 streams content to the rendering devices for real time play. In other implementations server 30 downloads the entire content or subset of the content to the devices. Some rendering devices may be able to decrypt the content (if the content is encrypted or other DRM protected) and detect a content identifier, e.g., an embedded digital watermark. Other rendering devices may rely on the home content server 30 for decryption (if needed) and identifier detection.

When content playing is requested, a rendering device 40-42 or home content server 30 checks the content item and/or frame headers for an identifier. In one embodiment, checking for an identifier includes a watermark detection process. In another embodiment, checking the content item includes extracting data from a file header. In still another embodiment, checking for an identifier involves both checking header data and detecting an embedded watermark.

In the case of checking a file header, if an identifier is found, and it is not part of an authenticated encryption package, it is self-authenticated. (This is particularly so when dealing with digital signatures or encryption authentication, etc.). This self-authentication process helps to ensure that the identifier has not been modified, including that it has not been copied from other content.

If a header identifier is not available or trusted, the content can be searched for a watermark identifier. (Alternatively, in another embodiment, an initial search for a watermark identifier is made.). Watermarks are inherently trusted due to the secrecy of their embedding key and/or self-authentication features. In an alternative embodiment, a so-called fragile watermark is used to enhance the security of an identifier. A fragile watermark can be designed to be lost, or to degrade predictably, when the data set into which it is embedded is processed in some manner. Thus, for example, a fragile watermark may be designed so that if an image is JPEG compressed and then decompressed, the watermark is lost. Or if an image is printed, and subsequently scanned back into digital form, the watermark is corrupted in a foreseeable way. Similarly, if a video or audio signal is converted from digital to analog the fragile watermark is corrupted or altered. (Fragile watermark technology is disclosed, e.g., in commonly assigned application Ser. Nos. 09/234,780, 09/433,104, 09/498,223, 60/198,138, 09/562,516, 09/567,405, 09/625,577, 09/645,779, and 60/232,163.). By such arrangements it is possible to infer how a data set has been processed by the attributes of a fragile watermark embedded in the original data set.

If the content is not identified, the home content server 30 (or rendering device) can handle the content according to a default usage rule or otherwise in a predetermined manner. For example, the server may allow unrestricted usage, or may permit a onetime play with copy restrictions. Alternatively, the home content server 30 may query central database 20 to receive guidance.

Once the content is identified, however, and the central database 20 provides usage rules associated with the content identifier, the home content server 30 or rendering device 40-42 determines whether, and/or to what extent, the content can be rendered according to the usage rules. The rendering device 40-42 may enforce these rules, or the home content server 30 may enforce them by withholding content from a rendering device 40-42 and 45 that it is not authorized to render the content. Since content is identified by content identifiers (e.g., digital watermark data), content can be tracked, managed, and rendered, even if it has left an encryption package. Indeed, linking an identifier to usage rules helps to ensure that the content can be controlled, even with out an encryption package.

In another embodiment, embedded data (e.g., watermark data) is extracted and used to determine if the content is even allowed outside an encryption package, and cause any open format content to be encrypted before it is played.

The identifier can also allow usage (e.g., playing, recoding, transferring, etc.) of the content to be tracked. In one embodiment, the tracking monitors each time that a content item is accessed. In another embodiment, the tracking determines how much of the content item is actually played. For example, if an identifier is continuously embedded throughout the content, either as metadata in frames or as digital watermarks, the identifier can be used to track how much of the content is played (e.g., a digital watermark counter). Further discussion regarding these and other techniques are found in assignee's copending U.S. patent application Ser. No. 09/574,668, filed May 18, 2000. Otherwise, frame-counting (or group of frames-counting) techniques can monitor the amount of content usage.

System 10 can optionally save watermark "bookmarks," so users can begin playing where they left off. In this case, a watermark identifier can be used to uniquely identify a location, chapter or segment within the content item. An identifier can then be used to index back into the content, much like a conventional bookmark.

A watermark identifier can also be even used to track quality by checking for degradation of the embedded data, such as through bit errors.

The home content server 30 can use tracking information (e.g., amount of content played, which content is accessed, types of use, etc.) to interact with a central billing agency 50. Central billing agency 50 can communicate with home content server 30 via the internet or other communications channel.

Central billing agency 50 can help facilitate billing for content consumed and/or used. Central billing agency 50 can also help ensure that other system participants, including content owners and providers, are properly paid. Optionally, the billing agency can provide information to the consumer about current billing and pricing on content before playing the content.

If content is not allowed to be played on the local home system or its usage rights are not know, the home content server 30 can obtain rights from central database 20. This process can be facilitated via internet or other communications channel. Alternatively, central or local information linked to an identifier can be used to provide the end-user directions on how to obtain rights. Thus, if content is obtained elsewhere, possibly from a file-sharing network or directly from a friend, the usage rights can be easily obtained from identifier-provided information. (Additional disclosure regarding using embedded data with file sharing can be found in assignee's U.S. patent application Ser. No. 09/620,019, filed Jul. 20, 2000.).

While the content is being played, the content identifier can be optionally used to provide or link to other information via additional data and links maintained in a content server or central database 20. This information can include new releases by the same artist or director, similar movies or songs, and related merchandise, etc. (U.S. patent application Ser. Nos. 09/620,019 and 09/571,422, filed May 15, 2000, include disclosure regarding linking to other information and actions via embedded data.). In addition, this information may provide opportunities to purchase the described or related items. Additionally, the identifiers can be used to link to interactive content, such as found on a web site.

A watermark identifier can provide additional advantages, such as providing copy protection bits within the embedded data that can be used to restrict or prohibit distribution (e.g., copying, transferring, rendering, etc.) of content to a format or media that may allow illegal distribution, such as a recordable DVD or CD. For example, home content server 30 may prohibit transfer of content, based on the copy protection bits, to recording device 45. If copy protection bits require that the content cannot be copied, but a content identifier links to usage rights or to a copy permission (either of which indicates permission for re-using or copying the content), the subsequently obtained permission preferably overrides the copy protection bits. In this case, a billing or central router can communicate to the home content server a permission (or updated usage rule) to indicate that the content can be re-used or copied according to permission. Hence, the permission or updated usage rule trumps the copy protection bits. (Of course obtaining the permission can be conditioned on payment or other billing requirements.). For non-DVD video and non-DVD or SDMI audio content, the presence of a specific watermark protocol can identify the content as protected. A fragile watermark can also be added for copy-once (i.e. one generation) capabilities, if desirable. In another embodiment, the presence of the watermark is determined in hardware, without reading the payload bits, thus reducing the cost of the copy control hardware. Then, the watermark payload is decoded in software. (Further discussion regarding copy control bits can be found in assignee's U.S. patent application Ser. No. 09/620,019.).

Thus, our rights management system is transparent and easy-to-use for the end-user, and allows copyright owners to protect and robustly track their content.

Distribution Chain

Figure 3:
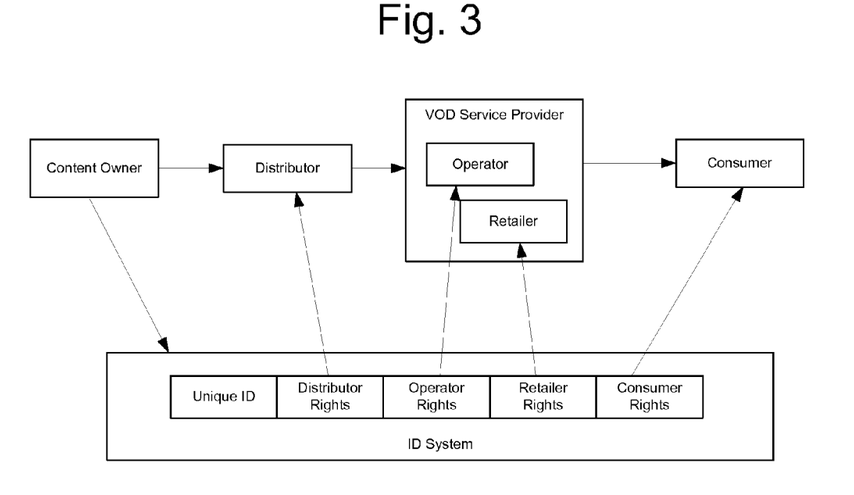
FIG. 3 illustrates an inventive content distribution chain.

Traditionally, content is sent in a distribution chain from a content owner to a distributor, and then on to a service provider (e.g., a VOD service provider) that may include either (or both) of a cable/satellite operator and online retailer. The content is then provided to a client (e.g., a home consumer). Our distribution chain, e.g., such as a video on demand (VOD) chain, is now described with respect to FIG. 3.

Figure 4:
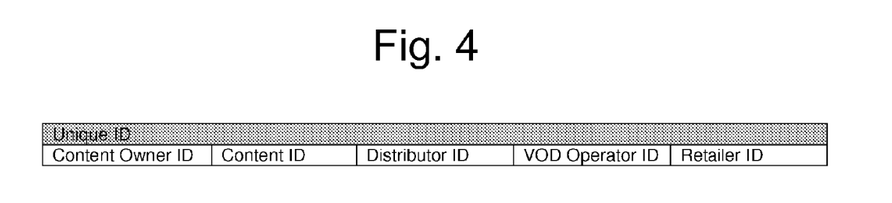
FIG. 4 illustrates a content identifier format.

The content is preferably uniquely identified. Content can be identified, e.g., by a digital watermark. In some cases the digital watermark includes a unique ID. The unique ID preferably includes at least a content identifier, and may also include a content owner ID, distributor ID, VOD service provider ID and/or a Retailer ID, as shown in FIG. 4. Of course alternative or additional fields can be used for a unique ID.

The unique ID and usage rules (e.g., for each of the distributor, operator, retailer, and consumer) are preferably created by the content owner and entered into an ID system. In one embodiment, an owner creates a unique ID by querying an ID system (or database) to obtain a unique identifier. These usage rules (or "rights") regulate the permissible use by the various distribution chain participants. The usage rules are indexed via the unique ID. The ID system preferably includes a database to help manage the content owner's unique IDs and usage rules and to help ensure that any given ID is not redundantly assigned. Preferably, the unique ID can be read at various participant points in the FIG. 3 distribution chain. The unique ID can be used to determine the usage rules at these various participant points. For example, the Distributor can access the unique ID and query the ID system to retrieve distributor-related usage rules. The ID System may optionally include an authenticated method to identify the participant (e.g., distributor, service provided, consumer). There are many suitable authenticating methods known in the art, e.g., such as providing a user ID, account number, IP address, digital signatures, numeric identifiers, etc. Of course other authenticating methods may be suitably interchanged with this authentication aspect of the present invention. The ID system determines the proper usage rules for a requesting participant and then returns the usage rules to them. The ID system can also return other desired information or links (e.g., URL, IP address, e-mail list, etc.). For example, the ID system may return a link to access information regarding the actors in a subject movie and their new releases. Or the link may relate to a particular audio file or song that is being played by the consumer. If a proprietary player or plug-in to the player is provided by the last member of the chain before the consumer, such as the retailer, the retailer ID does not need to be embedded and can be obtained from the proprietary player. However, if this content is found unpackaged outside the authorized consumer environment, it is advantageous to have the retailer ID as part of the digital watermark unique ID so the retailer's rules can be applied and the retailer is properly paid for that content.

Figure 5:
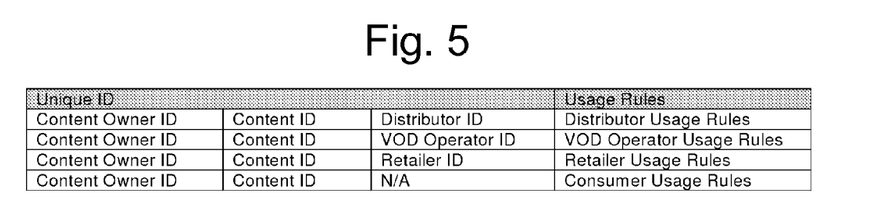
FIG. 5 illustrates a database structure for the distribution chain illustrated in FIG. 3.

The ID system can include a master database or a plurality of databases. (Of course the ID system will typically include a computer or server, running database management software, to help manage the database.). Our preferred database format, shown in FIG. 5, is used when a unique ID includes the ID of the requesting participant (e.g., Distributor ID, retailer ID, etc.) and its related usage rules. With this format, the unique ID identifies the requesting participant. So during a database interogation no additional information, besides the Unique ID, needs to be communicated to the database. The participant verification can be enhanced by using authenticated IDs including encryption and digital signatures, as well as different watermark algorithms (or payload structures) for each participant, where only that participant knows the algorithm. The secret part of the algorithm may vary a pseudo-random (PN) sequence for each participant. This process is also known as secret key watermarking.

Figure 6:
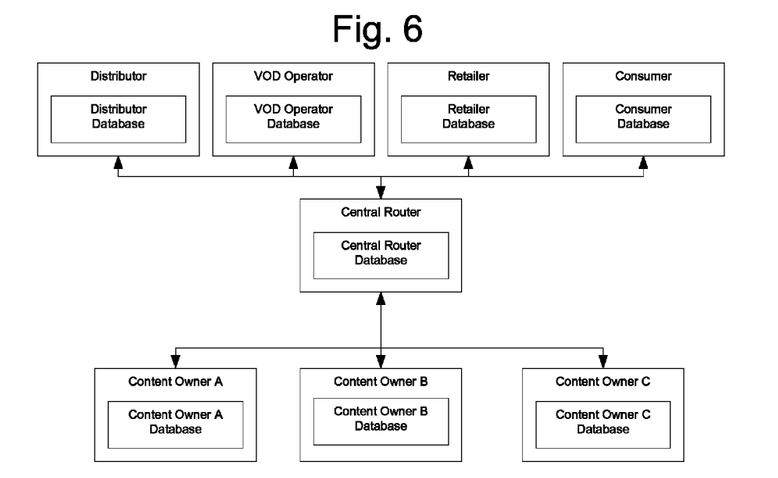
FIG. 6 illustrates an intelligent content distribution system, including linking databases via a central router to enhance efficiency and privacy of metadata.

The ID system may be maintained on one or many distributed central servers, as well as being "intelligently" distributed, as shown in FIG. 6. Intelligent distribution includes storing various unique IDs and usage rules (and optionally related content, e.g., URLs, IP addresses, etc.) on local databases within each participant site of the distribtuion chain shown in FIG. 3 (e.g., in the Distributor Database or the Retailer Database, etc.). Preferably, the locally stored data is relevant only to the local participant. For example, the VOD Operator Database preferably includes only those usage rules that are relevant to the VOD operator. Or the Consumer database includes only those usage rules and related content that are relative to the subject video (or audio) content.

A content owner creates (for his/her content) unique IDs and usage rules (and optionally related content) for each of the distribution chain participants. In one implementation, a content owner creates a unique ID by query central router database to obtain a suitable ID. Of course many content owners (A-C) may create unique IDs and usage rules as shown in FIG. 6. A central router and database are used to route the usage rules and any related data to a correct distribution chain participant. The central router database preferably only includes content owner IDs and content owner database addresses. In addition, the unique ID and database content is pushed from a content owner database to each other participant, including the consumer for content that she has licensed, through the central router. The database content can include the original content (videos, audio, etc.), usage rules and any related content (e.g., URLs, IP addresses, web pages, etc.). The pushed database content preferably includes only that information which is relevant to a particular participant. The distributor, VOD operator, retailer and consumer databases preferably only include the usage rules for that distributor, VOD operator, retailer and consumer, respectively. Local databases (e.g., the consumer and distributor databases) can be automatically updated such as hourly, daily, weekly, etc., to remain fresh and up-to-date information. No one database or router needs to include all the content's usage rules, which helps to ensure security for the content. Participants also benefit since they rarely need to request usage rules from the central server because the usage rules for their content are regularly pushed to them. The usage rules can be periodically updated. In the example structure shown in FIG. 5, the database entries which include that participant's ID and related information are stored in that participant's network and database.

Billing System

Figure 7:
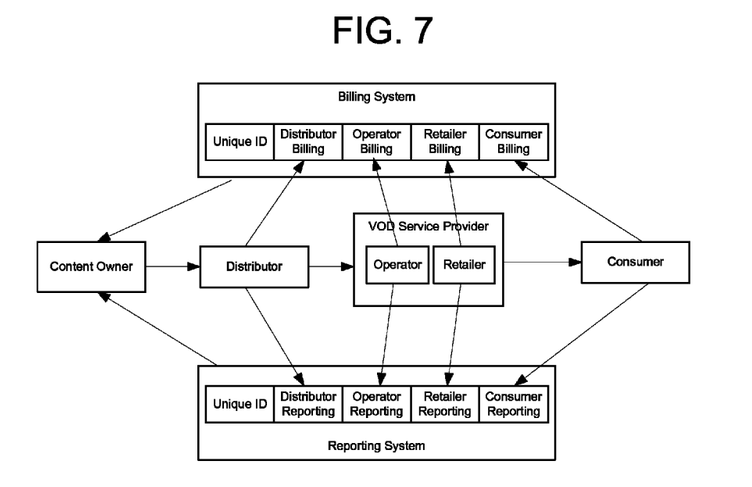
FIG. 7 illustrates a content distribution chain including a reporting system and a billing system.

The FIG. 4 unique ID can be used to maintain usage reporting and royalty billing, as shown in FIG. 7. FIG. 7 shows a centralized Reporting System and a centralized Billing System. Of course these systems can include computers and/or servers, tracking and accounting software executing on the servers and computers, and communications hardware/software, etc. The various participants (e.g., distributor, service provider, consumer, etc.) can be accurately billed for their access and/or handling of content based and tracked according to the unique ID. Of course the various participants can establishes accounts with the billing system, to facilitated billing, automatic billing, etc. (In the case of a permission overriding copy protection bits, described above, a consumer can establish an account so that when she requests permission to distribute copy-protected content, the account is automatically billed when the permission to distribute is sent to the consumer.). Usage is preferably reported to the reporting system according to the unique identifiers. Of course, the Reporting Systems and Billing Systems shown in FIG. 7 can be distributed so that each participant keeps track of their own billing similar to the FIG. 6 distributed system.

Figure 8:
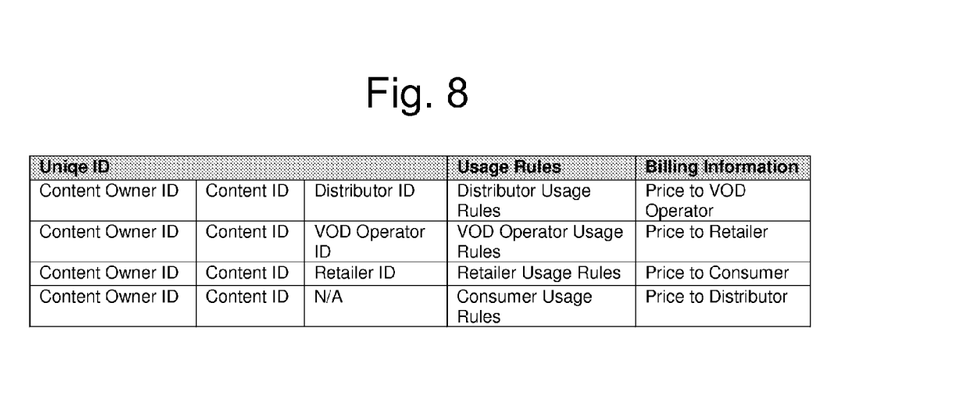
FIG. 8 illustrates the structure of FIG. 5, including billing information.

Some of the above-mentioned databases are described as including usage rights. These databases can be expanded to include billing information, as shown in FIG. 8. When the modified data structures are accessed, usage information can be optionally stored in the consumer's home system and updated to central systems to help track usage reporting and royalty billing, as shown in FIG. 7. The billing and reporting systems do not usually need to receive updates as often as the content usage rules. For example, the billing and reporting systems may be updated from the home system every two weeks or every month or so.

EXAMPLE

A distribution chain including a content owner A, VOD operator B, consumer C, and a video D is presented by way of example to illustrate one aspect of the present invention. Related, intelligently distributed databases are show in FIG. 9, where the central router database is located in mirrored locations for the central router, the content owner A database is located in mirrored locations within the content owner A's network, and the VOD operator B database is located in mirrored locations within the VOD operator B's network.

Figure 9:
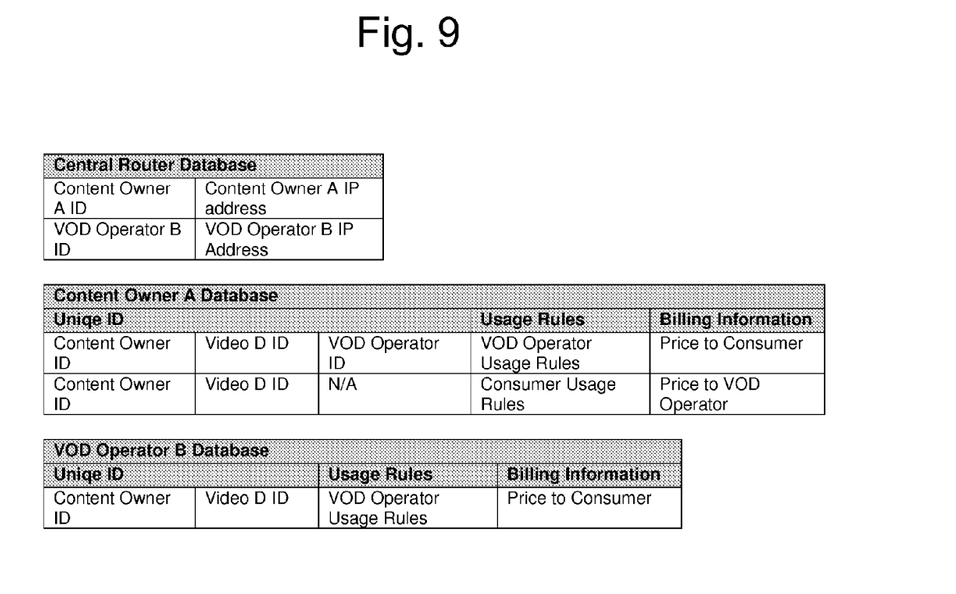
FIG. 9 demonstrates a distributed database exemplar system.

For this example we assume that video D includes a digital watermark embedded therein. The digital watermark preferably includes a unique ID that at least uniquely identifies the video as video D. When consumer C wants to watch video D, the consumer's player (or plug-in to the player, or central home server, etc.) decodes the digital watermark to extract the unique ID. The extracted unique ID is communicated to the central database. The central database uses the unique ID to identify a VOD operator B identifier, which is used to locate the VOD operator B's database (or database IP address). The unique ID is also used to locate an owner A identifier (ID), which is used to locate a content owner A's database (or database IP address). (We note that an alternative implementation involves communicating a unique ID, like the one shown in FIG. 4, which also includes the content owner ID and VOD provider ID. The central database uses the content owner ID and VOD ID to find the appropriate owner and VOD database IP address.). Once found, the content owner A's database provides usage rights for consumer C's usage, and the VOD operator B's database provides the consumer's pricing. Then, consumer C is informed of their rights for viewing and the price of, oh say $4.00 per view, by the player. The consumer can signal acceptance via the player, or viewing the video D can be deemed acceptance of the terms.

For example, lets now suppose that the consumer C watches the video D one and a half times. The amount of viewing is locally tracked in the player by counting or detecting digital watermarks that are embedded in video frames throughout the video D, e.g., embedded to correspond with 1 second intervals. The player reports the usage (along with the unique ID) to the central router database (or alternatively to the VOD operator B database). The amount owed for this usage, $6.00, can be recorded in the VOD operator billing information. (Of course, we expected that traditional billing methods, e.g., pre-authorization of a credit card or monthly billing, etc., can be used to collect or manage the amount due and can be stored locally until updated, such as to the VOD operator's billing system.). Based upon the unique ID, usage amount, and billing information provided to the content owner A via the VOD operator B, the content owner A is paid its share of the amount owned, e.g., perhaps 50% of the $6.00 (or $3.00).

Alternatively, a third party or clearinghouse is used for billing and reporting. In this case the player can report the unique ID and usage amount to the third party. Of course it would be beneficial to allow the content owner A access to the third party reporting to understand the amount and type of their content that is used.

Concluding Remarks

Having described and illustrated the principles of the technology with reference to specific implementations, it will be recognized that the technology can be implemented in many other, different, forms. To provide a comprehensive disclosure without unduly lengthening the specification, applicants herein incorporate by reference the patents and patent applications referenced above.

The various section headings in this document are provided for the reader's convenience and provide no substantive limitations. Of course, the subject matter under one section can be readily combined with the subject matter under another section.

The methods, processes, and systems described above may be implemented in hardware, software or a combination of hardware and software. For example, the watermark data encoding processes may be implemented in a programmable computer or a special purpose digital circuit. Similarly, watermark data decoding may be implemented in software, firmware, hardware, or combinations of software, firmware and hardware. The methods and processes described above may be implemented in programs executed from a system's memory (a computer readable medium, such as an electronic, optical or magnetic storage device). Finally, a content owner and content ID can be combined into one content ID which is desirable in situations, such as for audio and video content, where content owners, such as record labels and movie studios, are sold and traded between content groups.

The particular combinations of elements and features in the above-detailed embodiments are exemplary only; the interchanging and substitution of these teachings with other teachings in this and the incorporated-by-reference patents/applications are also contemplated.

We claim:

1. A method of regulating distribution of digital watermarked content, the method comprising:

decoding, using a processor, a digital watermark in the digital watermarked content, wherein the digital watermark comprises at least one component related to copy usage and at least one component related to content identification;

obtaining the copy usage component and the content identification component from the decoded digital watermark;
monitoring content subsets within the digital watermarked content using the digital watermark, wherein each content subset comprises a unique digital watermark identifying the content subset;
prohibiting the distribution of the digital watermarked content according to the copy usage component;
communicating the content identification component to a database, wherein the database uses the content identification to identify billing information related to distribution of the content;
receiving a permission to distribute the content from the database;
determining whether to prohibit distribution of the digital watermarked content based at least in part on the permission instead of on the copy usage component; and
creating a bookmark to a content subset using the unique digital watermark identifying the content subset.

2. The method of claim 1,
wherein the database uses the content identification component to identify the permission.

3. The method of claim 1, wherein the permission is associated with a billing or payment for distribution of the content.

4. The method of claim 1, wherein the distribution comprises at least one of copying, transferring or rendering.

5. An apparatus comprising:
a memory configured to store digital watermarked content; and
a processor programmed to:
  decode a digital watermark in the digital watermarked content, wherein the digital watermark comprises at least one component related to copy usage and at least one component related to content identification;
  monitor content subsets within the digital watermarked content using the digital watermark, wherein each content subset comprises a unique digital watermark identifying the content subset;
  obtain the copy usage component and the content identification component from the decoded digital watermark;
  prohibit the distribution of the digital watermarked content according to the copy usage component;
  communicate the content identification component to a database, wherein the database uses the content identification component to identify billing information related to distribution of the content;
  receive a permission to distribute the content from the database;
  determine whether to prohibit distribution of the digital watermarked content based on the permission instead of on the copy usage component; and
  save a bookmark to a content subset using the unique digital watermark identifying the content subset.

6. The apparatus of claim 5, wherein the database uses the content identification component to identify the permission.

7. The apparatus of claim 6, wherein the permission is associated with a billing or payment for distribution of the content.

8. The apparatus of claim 6, wherein the distribution comprises at least one of copying, transferring or rendering.

9. A non-transitory computer-readable medium having instructions stored thereon that, if executed by a computing device, cause the computing device to perform operations comprising:
decoding a digital watermark in the digital watermarked content, wherein the digital watermark comprises at least one component related to copy usage and at least one component related to content identification;
monitoring content subsets within the digital watermarked content using the digital watermark, wherein each content subset comprises a unique digital watermark identifying the content subset;
obtaining the copy usage component and the content identification component from the decoded digital watermark;
prohibiting the distribution of the digital watermarked content according to the copy usage component;
communicating the content identification component to a database, wherein the database uses the content identification component to identify billing information related to distribution of the content;
receiving a permission to distribute the content from the database;
determining whether to prohibit distribution of the digital watermarked content based on the permission instead of on the copy usage component; and saving a bookmark to a content subset using the unique digital watermark identifying the content subset.

10. The non-tangible computer-readable medium of claim 9, wherein the database uses the content identification component to identify the permission.

* * * * *